United States Patent
Pamer et al.

(10) Patent No.: US 6,409,444 B2
(45) Date of Patent: *Jun. 25, 2002

(54) SELF-PIERCING CLINCH NUT

(75) Inventors: W. Richard Pamer, Macedonia; Stanley H. Umbel, Windham, both of OH (US)

(73) Assignee: R B & W Corporation, Kent, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/814,444

(22) Filed: Mar. 22, 2001

Related U.S. Application Data (62) Division of application No. 09/275,309, filed on Mar. 24, 1999, now Pat. No. 6,220,804.

(51) Int. Cl.$^7$ ................................................. F16B 37/06
(52) U.S. Cl. ...................................... 411/180; 411/188
(58) Field of Search ................................. 411/179, 180, 411/181, 184, 188, 187; 29/432.2, 515, 798

(56) References Cited

U.S. PATENT DOCUMENTS

| | | |
|---|---|---|
| 1,332,686 A | 3/1920 | Reynolds |
| 3,053,300 A | 9/1962 | Quinto |
| 3,253,631 A | 5/1966 | Teusser |
| 3,736,969 A | 6/1973 | Warn |
| 3,810,291 A | 5/1974 | Ladouceur |
| 3,878,599 A | 4/1975 | Ladouceur |
| 4,432,681 A | 2/1984 | Capuano |
| 4,543,023 A | 9/1985 | Capuano |
| 4,690,599 A | 9/1987 | Shino |
| 4,708,556 A | 11/1987 | Pamer et al. |
| 4,893,976 A | 1/1990 | Milliser et al. |
| 5,340,251 A | 8/1994 | Takahashi et al. |
| 5,549,430 A | 8/1996 | Takahashi et al. |
| 5,797,175 A | * 8/1998 | Schneider .................... 411/180 |
| 6,125,524 A | * 10/2000 | Mueller ...................... 411/180 |

OTHER PUBLICATIONS

SPAC HGL, Nut Specifications, by R B & W Corporation, Form SP325C009, Rev. Oct. 8, 1996.

SPAC HGLB, Nut Specifications, by R B & W Corporation, Form SP325C0010, Rev. Oct. 8, 1996.

* cited by examiner

Primary Examiner—Flemming Saether
(74) Attorney, Agent, or Firm—Pearne & Gordon LLP

(57) ABSTRACT

A self-clinching fastener for attachment to a plastically deformable metal panel includes a body portion with a central axis and a central pilot portion extending from the body portion and coaxial with the central axis. The body portion forms a generally annular-shaped end face adjacent the central pilot portion and a groove defined in the end face encircling the central pilot portion. The groove has an inclined inner wall forming an undercut and an inwardly inclined bottom wall such that the groove has an increasing depth in a direction toward the undercut. The inclined bottom wall is formed by a plurality of generally flat faces and the inclined inner wall is formed by a plurality of generally flat faces which are aligned with the faces of the bottom wall. The fastener further includes a plurality of spaced apart lugs encircling the central. pilot portion and axially extending from at least one of the end face and the groove. The lugs form abutments to improve torsional resistance of the fastener.

16 Claims, 11 Drawing Sheets

SELF-PIERCING CLINCH NUT

This application is a division of application Ser. No. 09/275,309, filed Mar. 24, 1999 now U.S. Pat. No. 6,220,804.

BACKGROUND OF THE INVENTION

The present invention generally relates to self-attaching fasteners and, more specifically to clinch nuts and installation tooling therefor.

Self-attaching fasteners are used in many industries such as, for example, the automotive and appliance industries to secure various components to metal panels. When clinch nuts are attached to the metal panels, screws or bolts are threaded into the clinch nuts and tightened to prescribed torque values. During installation, the clinch nuts must have sufficient rotational resistance to keep them from rotating relative to the metal panels when the screws are inserted and tightened. During service, the clinch nuts must have sufficient pull-through resistance to keep them from pulling out of the metal panel when external forces such as, for example, vibration or other tensile forces are applied.

A clinch nut typically includes a central pilot or punch portion which at least partially extends into an opening in a metal plate or panel. When the clinch nut is self piercing, the central pilot portion cooperates with tooling to form the opening in the metal panel when attaching the clinch nut to the metal panel. The clinch nut is attached to the metal panel by a die member which forms a mechanical interlock between the clinch nut and the metal panel. The die member typically deforms the metal panel about the opening into an annular groove of the clinch nut which encircles the pilot portion and/or deforms the pilot portion of the clinch nut over the metal panel to entrap the metal panel.

For example, U.S. Pat. No. 3,053,300 discloses a clinch nut having a central pilot portion which extends through a pre-formed opening in a metal panel and is folded over to stake the periphery of the opening. The deformation of the central pilot forces the metal panel to conform to an undulating surface of the annular groove and to form the interlock between the clinch nut and metal panel. While this clinch nut may have a relatively high pull-out resistance, the deformation of the central pilot can easily distort the internal threads of the clinch nut.

One approach to eliminate distortion of the internal threads when deforming the pilot is to deform the metal panel to form the interlock rather than the pilot of the clinch nut. For example, U.S. Pat. Nos. 3,878,599 and 4,690,599 each disclose a clinch nut having an undercut on either the inner or outer wall of the groove. Material of the metal panel is forced into the undercut to improve the interlock formed between the clinch nut and the metal panel. With relatively thin metal panels, however, very little material is forced into the undercut, resulting in a relatively low pull-out resistance.

One approach to increase the pull-out resistance of clinch nuts of this type is to form a double-undercut groove. For example, U.S. Pat. No. 5,340,251 discloses a clinch nut having undercuts in both the inner and outer walls so that the annular groove is "dove-tail" shaped in cross section. The metal panel is forced into both of the undercuts to form an improved interlock between the clinch nut and metal panel. The deformation of the metal panel required to fill both-undercuts, however, is difficult to obtain using conventional forming techniques, resulting in inconsistent pull-out resistance.

An additional problem with the above-noted self-clinching fasteners is that they typically to not function well with thin metal panels, that is, panels of 3 mm or less. Accordingly, there is a need in the art for an improved clinch nut which can be reliably and consistently attached to a thin metal panel having sufficient pull-out strength, sufficient rotational resistance, and without having distortion of the internal threads. Additionally, there is a need for an improved die member for installing a clinch nut in a thin metal panel having sufficient pull-out strength, having sufficient rotational resistance, and without having distortion of the internal threads. Furthermore, there is a need for both the clinch nut and the die member to be relatively inexpensive to produce and relatively easy to use.

BRIEF SUMMARY OF THE INVENTION

The present invention provides a self-clinching fastener for attachment to a plastically deformable metal panel which overcomes at least some of the above-noted problems of the related art. According to the present invention, the self-clinching fastener includes a body portion with a central axis and a central pilot or punch portion extending from the body portion and coaxial with the central axis. The body portion forms a generally annular-shaped end face adjacent the central pilot portion and a groove defined in the end face encircling the central pilot portion. The groove has an inclined inner wall forming an undercut and an inwardly inclined bottom wall such that the groove has an increasing depth in a direction toward the undercut. The inclined bottom wall is formed by a plurality of generally flat faces, and a plurality of spaced apart lugs encircling the central pilot portion and axially extending from at least one of the end face and the groove. The lugs form abutments to improve torsional resistance of the fastener.

According to another aspect of the present invention, the self-clinching fastener includes a body portion with a central axis and a central pilot portion extending from the body portion and coaxial with the central axis. The body portion forms a generally annular-shaped end face adjacent the central pilot portion and a groove defined in the end face encircling the central pilot portion. The groove has an inner wall formed by a plurality of generally flat faces and a bottom wall formed by a plurality of generally flat faces. The faces of the bottom wall are aligned with the faces of the inner wall. A plurality of spaced apart lugs encircle the central pilot portion and axially extend from at least one of the end face and the groove. The lugs form abutments to improve torsional resistance of the fastener. Preferably, the groove further includes an outer wall formed by a plurality of generally flat faces aligned with the faces of the inner wall and the bottom wall.

According to yet another aspect of the present invention, a method of attaching a self-clinching fastener to a plastically deformable metal panel includes coaxially positioning the fastener and a die member on opposite sides of the metal panel at a position in which the fastener is to be secured to the metal panel. The fastener and the die member are oriented so that a plurality of inclined faces in a groove of the fastener and a cooperating plurality of inclined faces of the die member are circumferentially aligned. The die member and the fastener are then relatively moved toward one another in an axial direction to deform a portion of the panel into the groove of the fastener by coining the panel between the inclined faces of the fastener and the inclined faces of the die member and on opposite sides of lugs configured to improve torsional resistance of the fastener until a secure mechanical interlock is formed between the fastener and the panel.

According to even yet another aspect of the present invention, a self-clinching fastener for attachment to a plastically deformable metal panel includes a body portion with a central axis and a central pilot portion extending from the body portion and coaxial with the central axis. The body portion forms a generally annular-shaped end face adjacent the central pilot portion and a groove defined in the end face encircling the central pilot portion. The groove has an inclined inner wall forming an undercut and an inwardly inclined bottom wall such that the groove has an increasing depth in a direction toward the undercut. The inclined bottom wall is inclined at an angle greater than 2 degrees and less than about 50 degrees relative to a plane perpendicular to the central axis. The fastener further includes a plurality of spaced apart lugs encircling the central pilot portion and axially extending from at least one of the end face and the groove. The lugs form abutments to improve torsional resistance of the fastener. Preferably, the inclined bottom wall is inclined at an angle of about 20 degrees relative to the plane perpendicular to the central axis.

BRIEF DESCRIPTION OF THE SEVERAL VIEWS OF THE DRAWING

These and further features of the present invention will be apparent with reference to the following description and drawings, wherein.

DETAILED DESCRIPTION OF PREFERRED EMBODIMENTS

Figure 1:
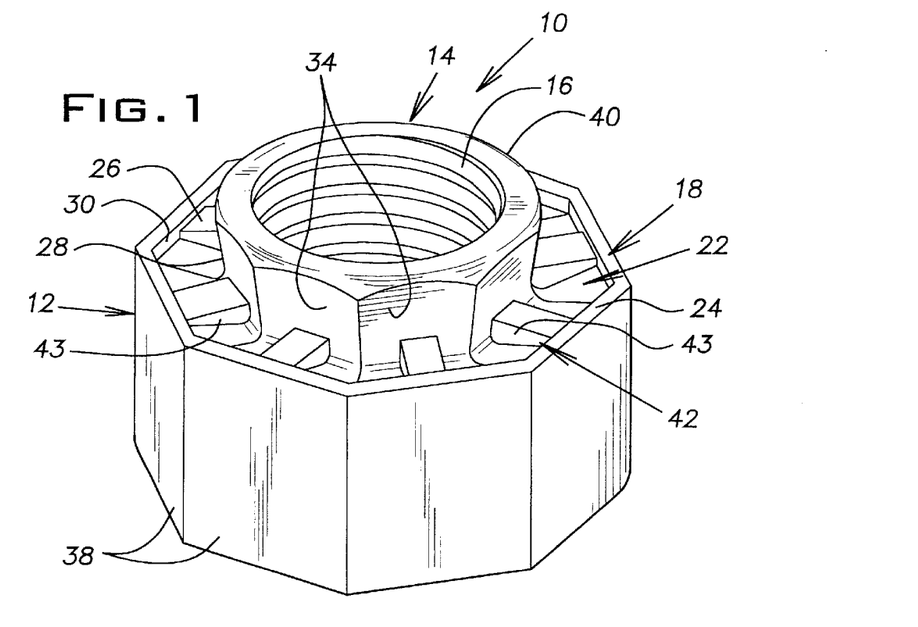
FIG. 1 is a perspective view of a clinch nut according to a first embodiment of the present invention.
Figures 2, 3:
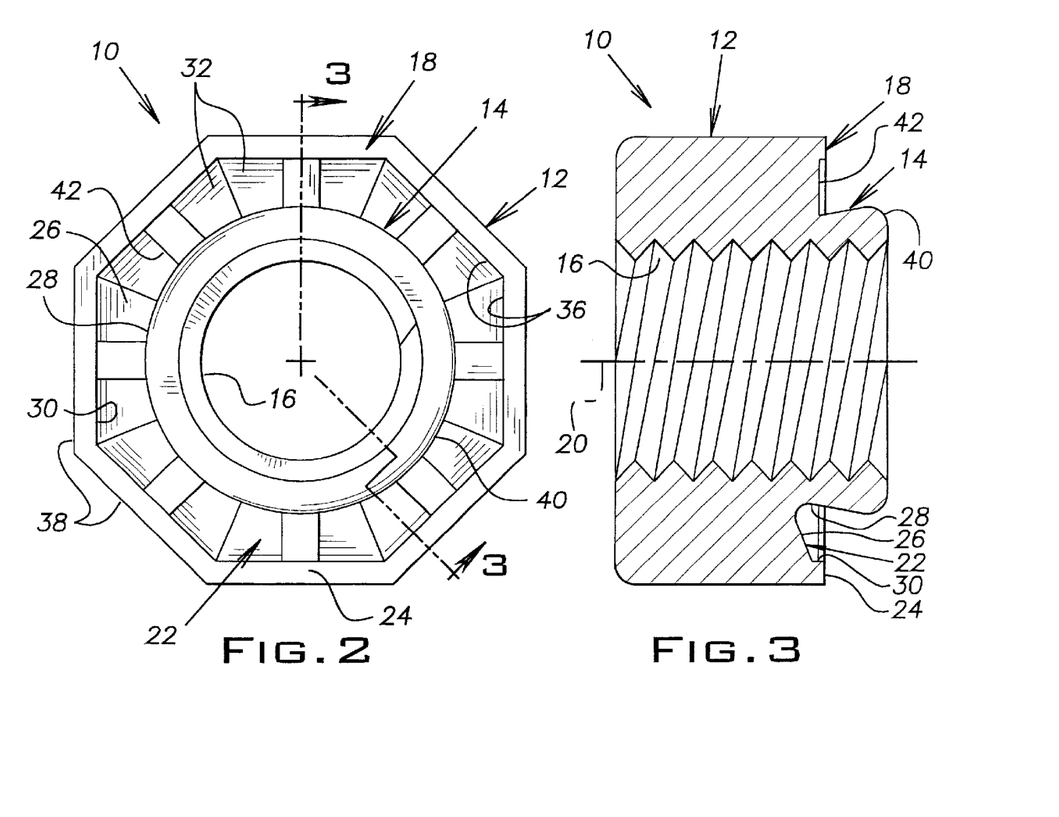
FIG. 2 is a top plan view of the clinch nut of FIG. 1.
FIG. 3 is a sectional view taken along line 3—3 of FIG. 2.

FIGS. 1–3 illustrate a self-piercing clinch nut 10 according to a first embodiment of the present invention for attachment to a plastically deformable metal plate or panel. It is noted that while the illustrated embodiment is a nut, other self-clinching fasteners such as, for example, self-clinching studs are within the scope of the present invention The clinch nut 10 has a body portion 12 and a pilot or punch portion 14 extending from one end of the body portion 12, and a threaded hole or bore 16 axially extending through both the body portion 12 and the punch portion 14.

The punch portion 14 is generally smaller than the body portion 12 to form a generally annular-shaped surface or end face 18 for engaging a metal panel as described in more detail hereinafter. The panel-engaging surface 18 is preferably substantially perpendicular to the central axis 20. A generally annular-shaped groove 22 is formed in the panel-engaging surface 18 and is preferably adjacent and/or contiguous with the punch portion 14. The groove 22 preferably does not extend to the outer edge of the panel-engaging surface 18 so that the panel-engaging surface 18 forms a lip 24 at the outer periphery of the groove 22. The lip 24 is a narrow bearing surface band which, while uniform in width, presents a continuously variable radial swept area to maximize the torsional integrity of the clinch nut 10. The groove 22 is preferably formed by a bottom wall 26, an inner wall 28, and an outer wall 30.

The illustrated bottom wall 26 is inwardly angled or inclined toward the inner wall 28, that is the groove 22 increases in depth when radially moving from the outer periphery of the bottom wall 26 to the inner periphery of the bottom wall 26. The bottom wall 26 is preferably inclined at an angle of greater than 5 degrees and less than about 50 degrees relative to a plane perpendicular to the central axis 20, is more preferably at an angle of about 10 degrees to about 45 degrees relative to a plane perpendicular to the central axis 20, and is most preferably at an angle of about 20 degrees relative to a plane perpendicular to the central axis 20. The angled or inclined bearing surface maximizes the extent to which the work-piece cooperates with the clinch nut 10 to resist axial loads which tend to separate the two components. Increasing the angle increases the depth of the groove 22 and therefore the length of the punch. This "punch length extension" allows the clinch nut to be secured to work-piece thicknesses well below prior art clinch nuts, that is, the clinch nut can be secured to work-pieces having thicknesses below 1.63 mm. If the angle gets too large, however, the length of the body portion 12 must be increased and tooling problems are created in forming the groove.

The bottom wall 26 is preferably polygonally-shaped wherein it is formed by a plurality of angled or inclined, planer or flat faces or facets 32. The bottom wall 26 is preferably formed by about 6 to about 10 of the faces 32, and is more preferably formed by about 8 of the faces 32. The polygonal-shape provides a non-uniform shape which constricts or coins the work-piece material during the clinch-nut setting process, thereby generating enhanced push-out resistance and torque-out resistance as described in more detail hereinafter. The bearing area is increased by increasing the number of the faces 32 (note the optimum bearing area is a cone) but this decreases the torsional resistance. When more than 10 of the faces 32 are used, the bearing surface begins to approximate a cone. When less than 6 of the faces 32 are used, too little bearing surface is available for adequate bearing loads. The octagon-shape using 8 of the faces 8 is a balance point between these two competing requirements.

The illustrated inner wall 28 is inwardly angled or inclined such that the groove 22 forms an undercut in the punch portion 14. The inner wall 28 is also preferably polygonally-shaped wherein it is formed by a plurality of angled or inclined, planar or flat faces or facets 34. The inner wall 28 is preferably formed by about 6 to about 10 of the faces 34, and is more preferably formed by about 8 of the faces 34. As illustrated, the inner wall 28 is most preferably formed by the same number of faces 34 as the bottom wall 26 and the faces 34 of the inner wall 28 are preferably circumferentially aligned with the faces 32 of the bottom wall 26 and the outer wall 30.

The illustrated outer wall 30 is substantially perpendicular to the panel-engaging surface 18, that is, the outer wall 30 is substantially parallel with the central axis 20. The outer wall 30 is also preferably polygonally-shaped wherein it is formed by a plurality of planar or flat faces or facets 36. The polygonal shape of the outer wall 30 enhances torsional resistance because the outer wall 30 must plow through work-piece material for the clinch nut to rotate relative to the work-piece. The outer wall 30 is preferably formed by about 6 to about 10 of the faces 36 and is more preferably formed by about 8 of the faces 36. As illustrated, the outer wall 30 is most preferably formed by the same number of faces 36 as the bottom and inner walls 26, 28 and the faces 36 of the outer wall 30 are preferably circumferentially aligned with the faces 32, 34 of the bottom and inner walls 26, 28. It is noted that the outer wall 30 can alternatively have other configurations within the scope of the present invention and can even be eliminated by extending the bottom wall 26 to the panel-engaging surface 18 or lip 24 (for example, see alternative embodiments illustrated in FIGS. 10–21).

The illustrated body portion 12 has an outer periphery which is polygonally-shaped wherein it is formed by a plurality of planar or flat faces or facets 38. The outer periphery is preferably formed by about 6 to about 10 faces 38, and is more preferably formed by about 8 faces 38. As illustrated, the outer periphery is preferably formed by the same number of faces 38 as the walls 26, 28, 30 of the groove 22 and the faces 38 of the outer periphery are preferably circumferentially aligned with the faces 32, 34, 36 of the groove walls 26, 28, 30. It is noted, however, that the outer periphery of the body portion 12 can alternatively have other configurations within the scope of the present invention such as, for example, cylindrical. The length of the body portion 12 is sized to provide sufficient thread engagement to consistently break (without stripping the threads) the mating externally threaded member whose material strength properties are matched to those of the clinch nut 10.

In the illustrated embodiment, the inner wall 28 of the groove 22 is contiguous with the outer periphery of the punch portion 14 so that the inner wall 28 generally forms the outer periphery of the punch portion 14. It is noted, however, that the outer periphery of the punch portion 14 can have other configurations within the scope of the present invention. The outer or free end of the punch portion 14, which is opposite the body portion 12, has a piercing or shearing edge 40 formed thereon. As described in more detail hereinafter, the shearing edge 40 cooperates with a die member to perforate or shear a metal plate or panel during installation of the clinch nut 10 in the metal panel. The length of the punch portion 14 is preferably sized to accommodate the work-piece material thickness without protruding beyond the plane formed by the back side of the work-piece as described in more detail hereinafter. The diameter of the punch portion 14 is preferably sized to provide sufficient column strength to allow the clinch nut 10 to punch its own hole into materials up to 3 mm thick at a maximum hardness of 60 on the Rockwell C hardness scale (approximately 50,000 p.s.i. ultimate tensile strength of the work-piece material). It should be obvious that for thinner and/or softer materials, these maximum values would be increased. It should also be obvious that for thicker materials and/or harder materials, the punch portion geometry can be sized to accommodate the requirements of those work-pieces.

The clinch nut 10 also includes a plurality of locking members or lugs 42 for increasing the torque or rotational resistance of the clinch nut 10. The lugs 42 are raised lobes or protuberances which axially extend above the panel-engaging surface 18, the groove 22, or the lip 24 and circumferentially extend over a limited distance such that abutments 43 are formed which impede or resist rotation of the clinch nut 10 relative to the metal panel. The abutments 43 are preferably perpendicular to the rotational motion of the nut. In the illustrated embodiment, the lugs 42 are formed by protuberances which axially extend above the groove bottom wall 26 and radially extend across the groove 22 from the groove inner wall 28 to the groove outer wall 30. The upper sides of the lugs 42, which are the sides opposite the bottom wall 26, are generally perpendicular to the central axis 20 and are generally parallel to the lip 24 but are preferably recessed below the lip 24. The lugs 42 are preferably circumferentially spaced apart along the bottom wall 26 and there is preferably a lug 42 centrally located on each face 32 of the bottom wall 26. It is also noted, however, that the lugs 42 may be located at other positions such as the interface between adjacent faces 32 of the bottom wall 26. The cross-sectional shape of the illustrated lugs 42 is rectangular. The cross-sectional shape of the lugs 42, however, may be any other suitable shape.

It is noted that adjacent faces 32 of the bottom wall 26 may alternatively be joint-free at the corners of the nut body portion 12 and jointed at the radial centerlines of the lugs 42. This alternative may give the area of the groove 22 increased torsional loading resistance because the abutments 43 would be axially larger and therefore give more torsional resistance.

For example, an acceptable clinch nut 10 having a thread size of M10×1.5 and for work pieces having a minimum thickness of 0.050 inches (1.27 mm) can have a bottom wall 26 with eight facets 32 inclined at an angle of about 20°. The facets 32 are aligned with eight facets 34 of the punch portion inner wall 28, eight facets 36 of the outer wall 30, and eight faces 38 of the body portion outer periphery. The outer wall 30 has a height of about 0.015 inches to about 0.025 inches. The body portion is about 0.712 to about 0.730 inches across corners, is about 0.666 to about 0.674 inches across flats, and has a height of about 0.314 to about 0.318 inches. The distance between inner edges of the lip 24 is about 0.600 to 0.606 inches. The punch portion 14 has a height of about 0.043 to about 0.047 inches above the lip 24, a diameter of about 0.514 to about 0.518 inches, and a base diameter at the bottom wall of about 0.484 inches maximum. The lugs 42 have a width of about 0.058 to about 0.081 inches.

Figure 4:
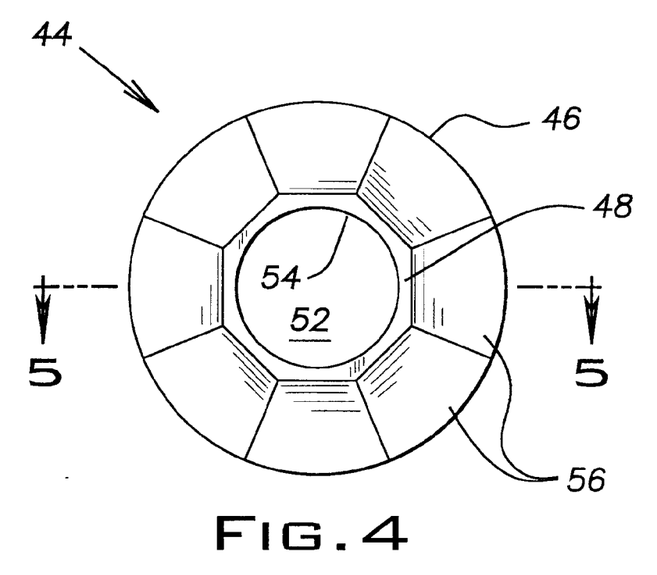
FIG. 4 is a bottom plan view of die for installing the clinch nut according to the present invention.
Figure 5:
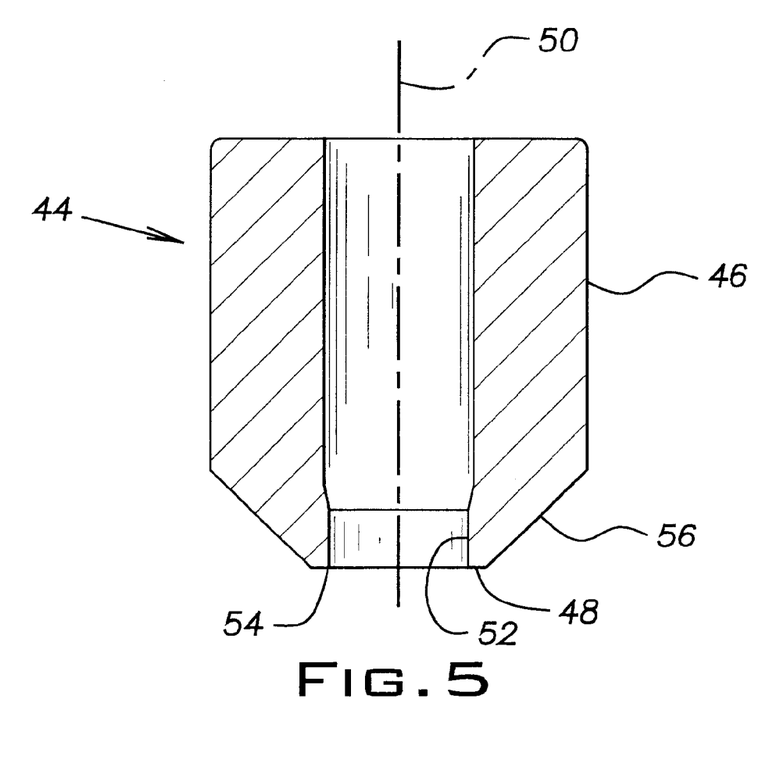
FIG. 5 is a sectional view taken along line 5—5 of FIG. 4.

FIGS. 4 and 5 illustrate a die member 44 according to the present invention which is used to attach the clinch nut 10 to a metal panel or plate. The die member 44 has a generally cylindrical-shaped body 46 with a panel-engaging end face or surface 48 which is substantially perpendicular to the central axis 50. An axially extending central bore or opening 52 forms a piercing or shearing edge 54 at the inner edge of the panel engaging end face 48. The shearing edge 54 is sized and shaped to cooperate with the shearing edge 40 of the clinch nut 10 (FIGS. 1–3) to perforate or shear a metal plate or panel during installation of the clinch nut 10 in the metal panel. The generally annular-shaped engagement end face 48 is sized to cooperate with and/or extend into the groove 22 of the clinch nut 10. Although in some instances the end face 48 may be sized to cooperate with the surface 18 to create a constriction and pinching action upon the panel 58 thereby trapping and further compacting the metal panel 58 into the groove 22. Adjacent the panel-engaging end face 48 are a plurality of angled or inclined, planar or flat faces or facets 56. It is noted that the outer periphery of the panel-engaging end face 48 is polygonally-shaped due to the inclined faces 56. In the illustrated embodiment, the outer edge of the panel-engaging end face 48 is octagonal while the inner or shearing edge 54 is circular. It should be obvious that for simplicity of manufacturing of the die member 44, the outer edge of end face 48 could be round and the inclined faces 56 could be one contiguous conical surface.

The quantity of the faces 56 of the die member 44 is the same as the quantity of the faces 32 on the bottom wall 26 of the clinch nut 10 (FIGS. 1–3) to be installed by the die member 44. The faces 56 of the die member 44 are sized and shaped to cooperate with the faces 32 of the clinch nut bottom wall 26 as described in more detail hereinbelow. The angle of the faces 56 of the die member 44 are also sized to cooperate with the bottom wall 26 of the clinch nut 10. For example, when the bottom wall 26 of the clinch nut 10 is angled about 20 degrees relative to a plane perpendicular to the central axis 20, the faces 56 of the die member 44 are preferably angled about 18 to 22 degrees relative to a plane perpendicular to the central axis 50.

Figure 6A:
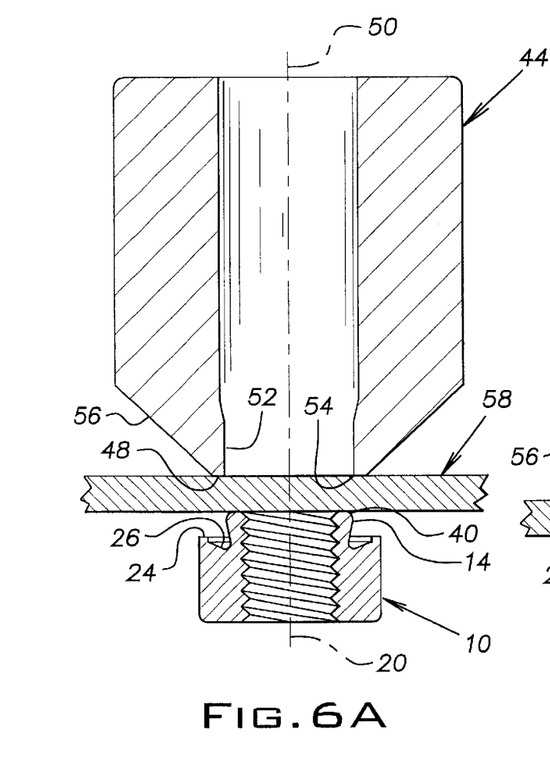
FIGS. 6A to 6C are elevational views, in cross-section, showing various stages of installation of the clinch nut of FIG. 1 using the die of FIG. 4.
Figures 6B, 6C:
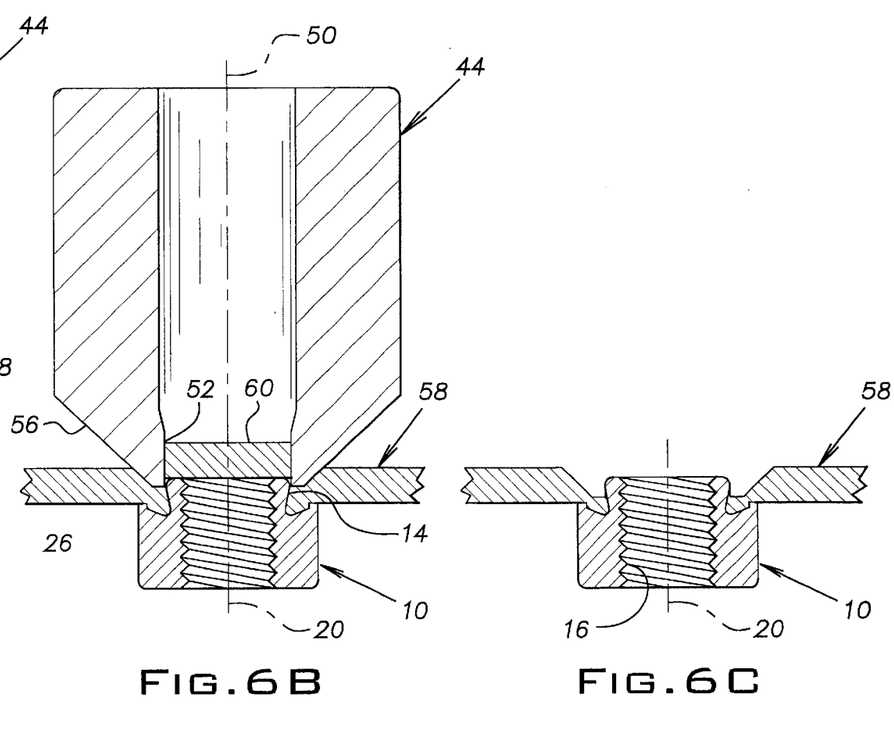

FIGS. 6A to 6C illustrate installation of the clinch nut 10 into a metal panel or plate 58 using the die member 44, typically referred to as the "nut setting process". The clinch nut 10 and the die member 44 are coaxially positioned on opposite sides of the metal panel 58 at a position in which the clinch nut 10 is to be secured to the metal panel 58 (best shown in FIG. 6A). The clinch nut 10 and the die member 44 are also circumferentially oriented so that the inclined faces 32 of the clinch nut bottom wall 26 and the inclined faces 56 of the die member are circumferentially aligned.

The die member 44 and the clinch nut 10 are relatively moved toward one another in an axial direction by any suitable manner such as a mechanical press or a hydraulic or pneumatic plunger. It is noted that the relative movement between the clinch nut 10 and the die member 44 can be achieved by moving either one or both of the components. The relative movement between the clinch nut 10 and the die member 44 causes the shearing edges 40, 54 to cooperate to shear or punch an opening in the metal panel 58 (best shown in FIG. 6B) into which the punch portion 14 of the clinch nut 10 extends. The resulting metal slug 60 is forced into the central opening 52 in the die member 44.

The relative movement between the clinch nut 10 and the die member 44 is continued until the lip 24 of the clinch nut 10 engages the metal panel 58 and the panel-engaging end face 48 of the die member 44 forces metal material of the metal panel 58 into the groove 22 of the clinch nut 10. Metal material is coined between the bearing surface of the clinch nut 10 and the bearing surface of the die member 44. The coining action causes material to flow into recesses in the clinch nut 10 which enhances retention of the clinch nut 10 to the metal panel 58 to resist torsional load or push out forces. Material is forced into the undercut at the groove inner wall 28 to improve pull-out strength and is forced into the corners formed by the polygonally-shaped groove walls 26, 28, 30 and the sides of the lugs 42 to improve torque resistance.

While the width of the die end face 48 is radially smaller than the width of the clinch nut groove 22 in the illustrated embodiment, it is noted that the width of the die end face 48 can be increased so that it extends radially outward beyond the clinch nut 10. This is particularly desirable when the metal panel 58 is a softer material in order to limit intrusion of the die 44 into the panel 58. It is also noted that when the metal panel 58 is a softer material, the lip 24 of the clinch nut 10 may intrude the metal panel 58 rather than just engage it as shown in FIG. 6C.

Once the die member 44 is removed, the clinch nut 10 is securely fastened to the metal panel 58 (best shown in FIG. 6C). The punch portion 14 of the clinch nut 10 extends into the opening formed in the metal panel 58 but preferably does not extend beyond the other surface of the metal panel 58. Installed in this manner, a threaded fastener can be inserted in the threaded opening 16 of the clinch nut 10 to secure a desired item to the metal panel 58. It is noted that this procedure is to secure the clinch nut 10 to thin metal panels 58, that is, panels having a thickness of 3 mm or less. For metal panels having a thickness of greater than 3 mm, the aperture or opening is preferably pre-punched unless the nut's punch portion 14 and body portion 12 are resized as previously described. The remaining methodology for installation is the same.

Figure 7:
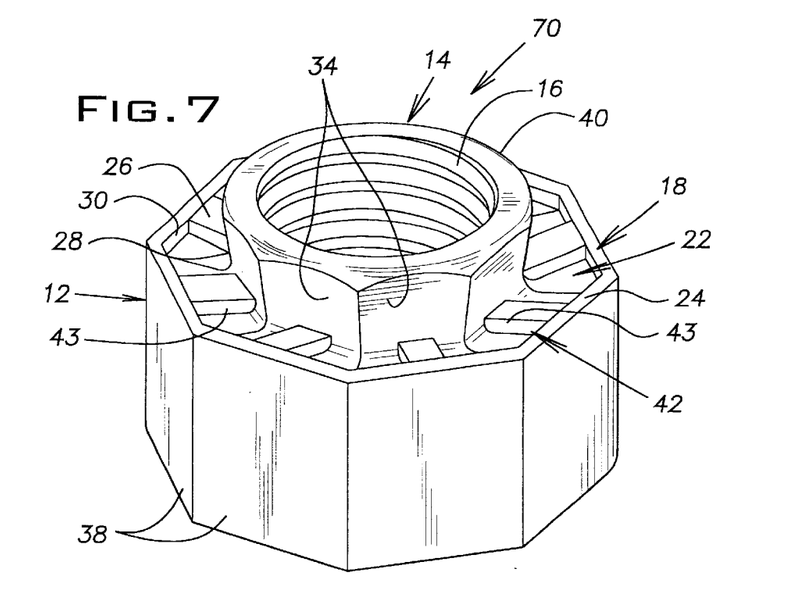
FIG. 7 is a perspective view of a clinch nut according to a second embodiment of the present invention.
Figure 8:
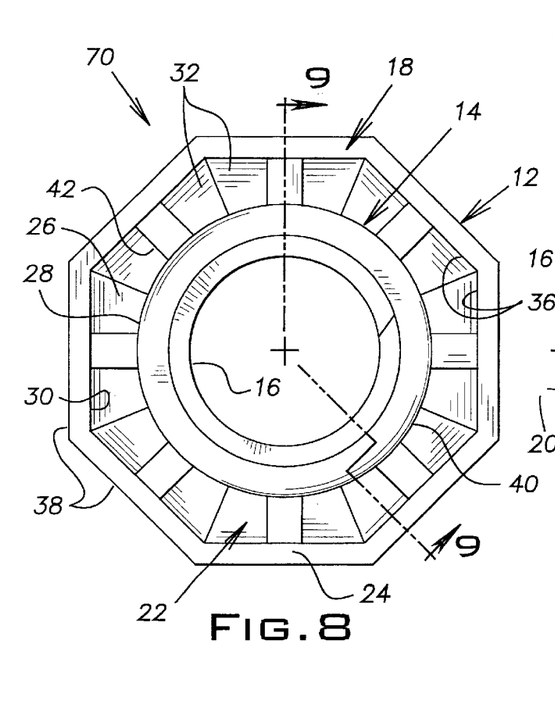
FIG. 8 is a top plan view of the clinch nut of FIG. 7.
Figure 9:
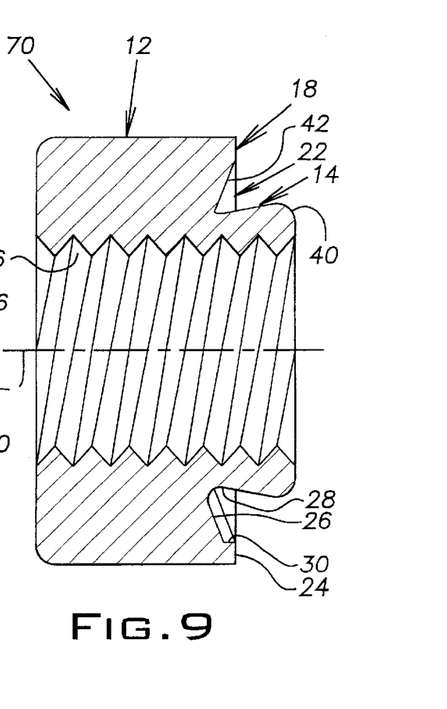
FIG. 9 is a sectional view taken along line 9—9 of FIG. 8.

FIGS. 7–9 illustrate a self-piercing clinch nut 70 according to a second embodiment of the present invention wherein like reference number are utilized to indicate like structure. The clinch nut 70 of the second embodiment is substantially the same as the clinch nut 10 of the first embodiment described in detail hereinabove except that the lugs 42 are of a different configuration. The clinch nut 70 of the second embodiment illustrates that the lugs 42 can have a different shape.

In the second embodiment, the lugs 42 are formed by protuberances which axially extend above the groove bottom wall 26 and radially extend across the groove 22 from the groove inner wall 28 to the groove outer wall 30. The upper sides of the lugs 42, which are the sides opposite the bottom wall 26, are generally parallel with the bottom wall 26 and angled or inclined relative to the lip 24. The outer ends of lug upper sides preferably meet the inner edge of the lip 24 but alternatively can be recessed below the lip 24. The lugs 42 are preferably circumferentially spaced apart along the bottom wall 26 and preferably there is a lug 42 centrally located on each face of the bottom wall 26. The cross-sectional shape of the illustrated lugs 42 is rectangular. The cross-sectional shape of the lugs 42, however, may be any other suitable shape.

For example, an acceptable clinch nut 70 having a thread size of M10×1.5 and for work pieces having a minimum thickness of 0.050 inches (1.27 mm) can have a bottom wall 26 with eight facets 32 inclined at an angle of about 20°. The facets 32 are aligned with eight facets 34 of the punch portion inner wall 28, eight facets 36 of the outer wall 30, and eight faces 38 of the body portion outer periphery. The outer wall 30 has a height of about 0.005 inches to about 0.015 inches. The body portion is about 0.712 to about 0.730 inches across corners, is about 0.666 to about 0.674 inches across flats, and has a height of about 0.314 to about 0.318 inches. The distance between inner edges of the lip 24 is about 0.600 to about 0.606 inches. The punch portion 14 has a height of about 0.043 to about 0.047 inches above the lip 24, a diameter of about 0.514 to about 0.518 inches, and a base diameter at the bottom wall of about 0.484 inches maximum. The lugs 42 have a width of about 0.058 to about 0.081 inches.

Figure 10:
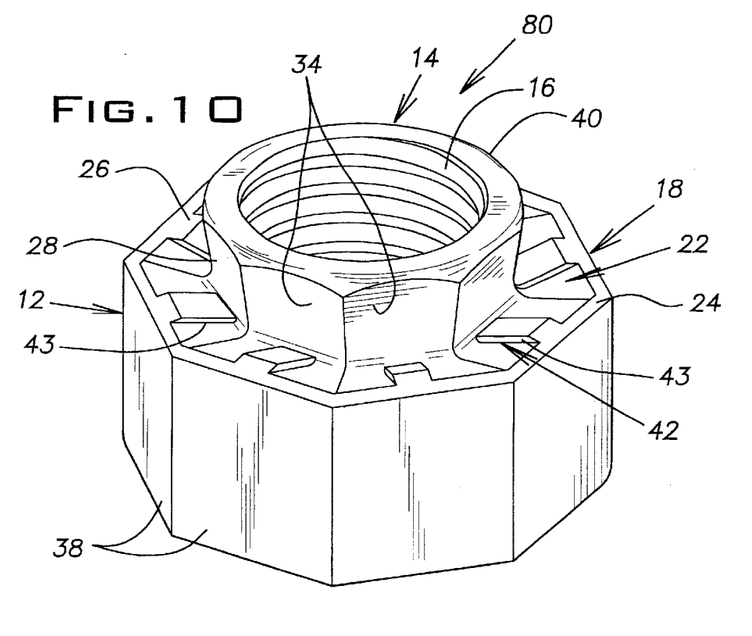
FIG. 10 is a perspective view of a clinch nut according to a third embodiment of the present invention.
Figure 11:
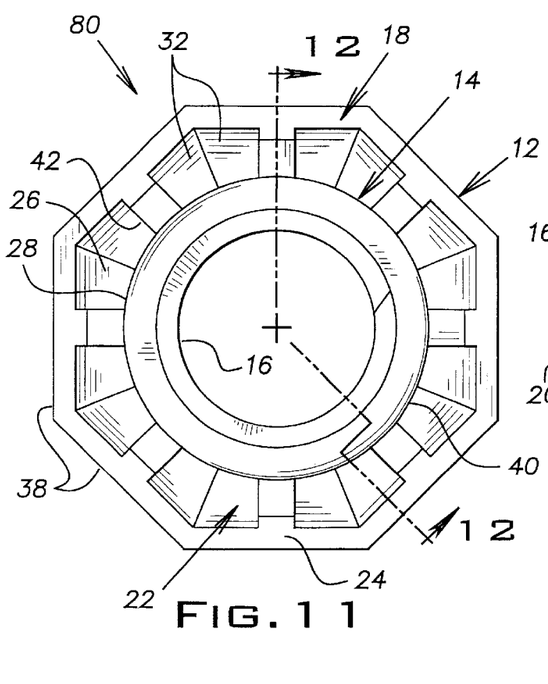
FIG. 11 is a top plan view of the clinch nut of FIG. 10.
Figure 12:
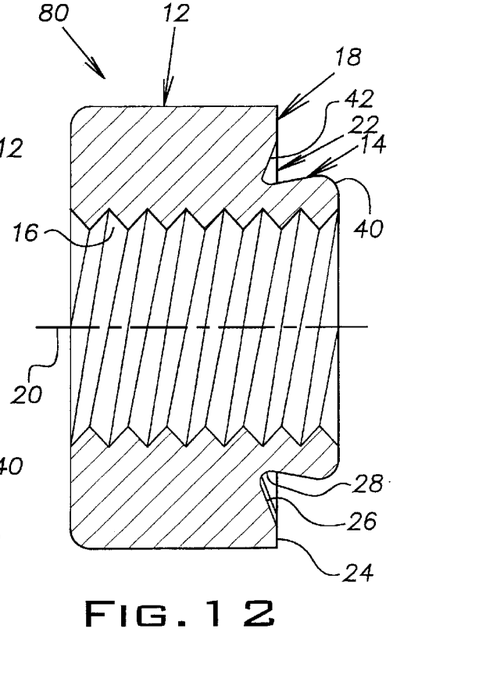
FIG. 12 is a sectional view taken along line 12—12 of FIG. 11.

FIGS. 10–12 illustrate a self-piercing clinch nut 80 according to a third embodiment of the present invention wherein like reference numbers are utilized to indicate like structure. The clinch nut 80 of the third embodiment is substantially the same as the clinch nuts 10, 70 of the first and second embodiments described in detail hereinabove except that the outer wall 30 of the groove 22 is eliminated and the lugs 42 are of a different configuration. The clinch nut 80 of the third embodiment illustrates that the groove 22 can have a different shape and further illustrates that the lugs 42 can have other shapes.

In the third embodiment, the groove 22 is formed by only the bottom wall 26 and the inner wall 28. The bottom and inner walls 26, 28 are preferably sized and shaped the same as described in detail hereinabove with regard to the first embodiment except that the outer edge of the bottom wall 26 extends to and meets the inner edge of the lip 24. It is noted that the depth of the groove 22 is reduced when the outer wall 30 is eliminated and all other dimensions remain the same.

In the third embodiment, the lugs 42 are formed by protuberances which axially extend above the groove bottom wall 26 and radially extend across the groove 22 from the groove inner wall 28 to the lip 24. The upper side of the lugs 42, which is the side opposite the bottom wall 26, is generally parallel with the bottom wall 26 and angled or inclined relative to the lip 24. The lugs 42 preferably have outer end surfaces 82 which are parallel and co-planar with the lip 24 so that the lugs 42 do not extend above the lip 24. Configured in this manner, the outer end surfaces 82 of the lugs 42 appear to be inwardly directed extensions of the lip 24. The outer ends of the lug lower sides meet the inner edge of the lip 24 along the bottom wall 26. The lugs 42 are preferably circumferentially spaced apart along the bottom wall 26 and preferably there is a lug 42 centrally located on each face 32 of the bottom wall 26. The cross-sectional shape of the illustrated lugs 42 is rectangular. The cross-sectional shape of the lugs 42, however, may be any other suitable shape.

For example, an acceptable clinch nut 80 having a thread size of M10×1.5 and for work pieces having a minimum thickness of 0.050 inches (1.27 mm) can have a bottom wall 26 with eight facets 32 inclined at an angle of about 20°. The facets 32 are aligned with eight facets 34 of the punch portion inner wall 28 and eight faces 38 of the body portion outer periphery. The body portion is about 0.712 to about 0.730 inches across corners, is about 0.666 to about 0.674 inches across flats, and has a height of about 0.314 to about 0.318 inches. The distance between inner edges of the lip 24 is about 0.600 to about 0.606 inches. The punch portion 14 has a height of about 0.043 to about 0.047 inches above the lip 24, a diameter of about 0.514 to about 0.518 inches, and a base diameter at the bottom wall of about 0.484 inches maximum. The lugs 42 have a width of about 0.058 to about 0.081 inches and a thickness of about 0.005 inches to 0.010 inches.

Figure 13:
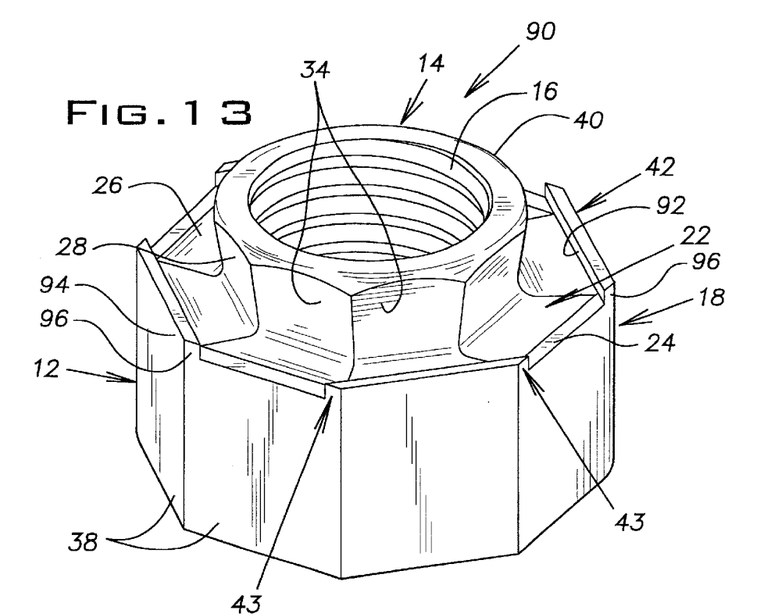
FIG. 13 is a perspective view of a clinch nut according to a fourth embodiment of the present invention.
Figure 14:
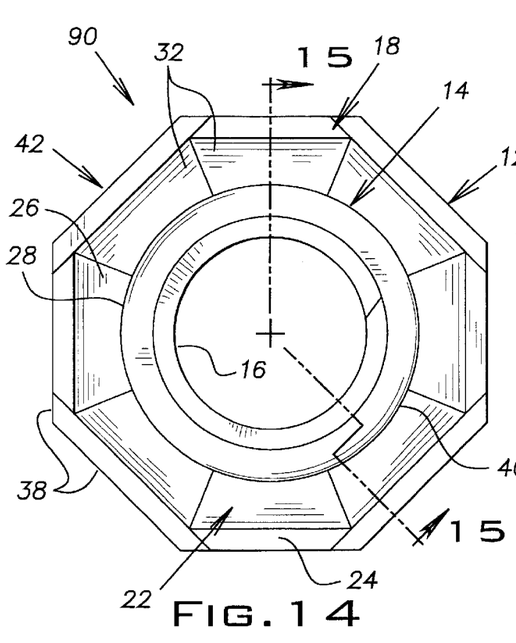
FIG. 14 is a top plan view of the clinch nut of FIG. 13.
Figure 15:
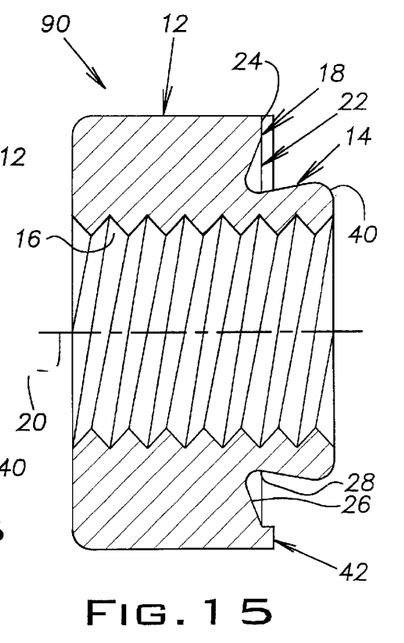
FIG. 15 is a sectional view taken along line 15—15 of FIG. 14.

FIGS. 13–15 illustrate a self-piercing clinch nut 90 according to a fourth embodiment of the present invention wherein like reference numbers are utilized to indicate like structure. The clinch nut 90 of the fourth embodiment is substantially the same as the clinch nut 80 of the third embodiment described in detail hereinabove except that the lugs 42 are of a different configuration. The clinch nut 90 of the fourth embodiment illustrates that the lugs 42 can have a different location.

In the fourth embodiment, the lugs 42 are formed by protuberances which axially extend above the lip 24 rather than the bottom wall 26 of the groove 22. The upper sides of the lugs 42 are generally parallel with the lip 24. The lugs 42 preferably have inner and outer side surfaces 92, 94 and end surfaces 96 which are perpendicular to the lip 24. The lugs 42 each extend along the lip 24 and are spaced apart along the lip 24. The lugs 42 preferably have a width generally equal to the width of the lip 24. In the illustrated embodiment, the lugs 42 are located adjacent alternating faces 32 of the bottom wall 26 and the lugs 42 extend a distance slightly longer than the width of each face 32 of the bottom wall 26. The lug outer sides 94 extend the width of a single face 32 of the bottom wall 26 and the lug inner sides 92 extend beyond the width of a single face 32 of the bottom wall 26 to the outer edge of the lip 24. It is noted that any other suitable quantity, shape, or length of the lugs 42 can be alternatively utilized. The cross-sectional shape of the illustrated lugs 42 is rectangular. The cross-sectional shape of the lugs 42, however, may be any other suitable shape. It is noted that any other suitable quantity or length of lugs 42 can be alternatively utilized. It is also noted that the lugs 42 can protrude above the lip 24 in this manner when the groove 22 has an outer wall 30 as described in detail hereinabove with reference to the first and second embodiments.

For example, an acceptable clinch nut 90 having a thread size of M10×1.5 and for work pieces having a minimum thickness of 0.050 inches (1.27 mm) can have a bottom wall 26 with eight facets 32 inclined at an angle of about 20°. The facets 32 are aligned with eight facets 34 of the punch portion inner wall 28, and eight faces 38 of the body portion outer periphery. The body portion is about 0.712 to about 0.730 inches across corners, is about 0.666 to about 0.674 inches across flats, and has a height of about 0.314 to about 0.318 inches. The distance between inner edges of the lip 24 is about 0.600 to about 0.606 inches. The punch portion 14 has a height of about 0.043 to about 0.047 inches above the lip 24, a diameter of about 0.514 to about 0.518 inches, and a base diameter at the bottom wall of about 0.484 inches maximum. The lugs 42 have a height of about 0.05 mm to 0.20 mm.

Figure 16:
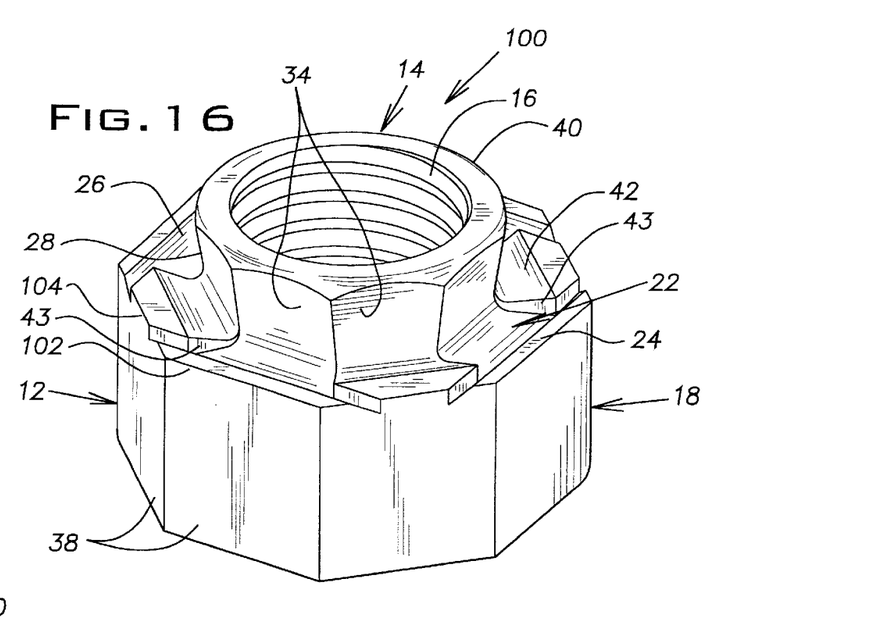
FIG. 16 is a perspective view a clinch nut according to a fifth embodiment of the present invention.
Figure 17:
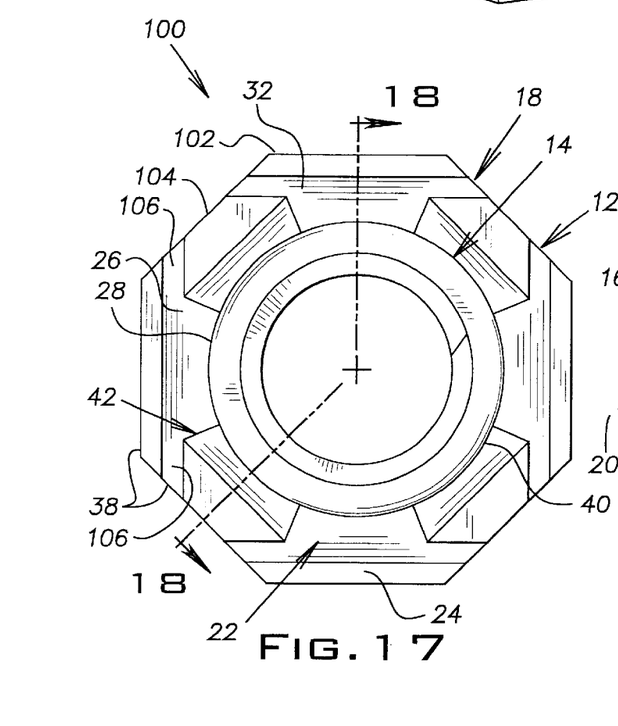
FIG. 17 is a top plan view of the clinch nut of FIG. 16.
Figure 18:
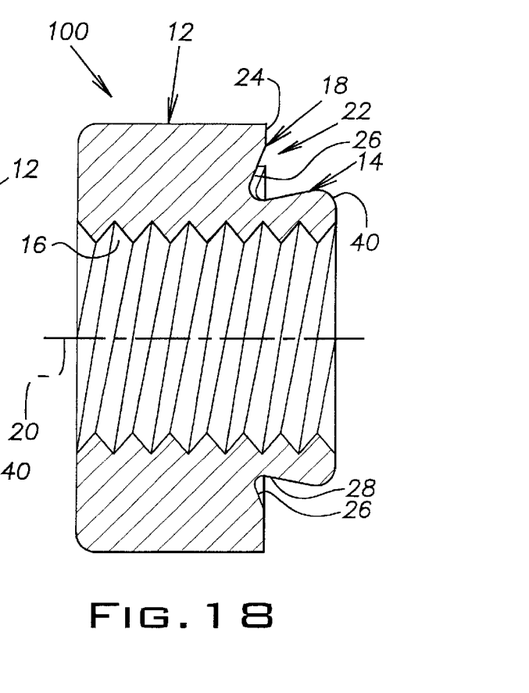
FIG. 18 is a sectional view taken along line 18—18 of FIG. 17.

FIGS. 16–18 illustrate a self-piercing clinch nut 100 according to a fifth embodiment of the present invention wherein like references are used to indicate like structure. The clinch nut 100 of the fifth embodiment is substantially the same as the clinch nuts 10, 70, 80, 90 of the first four embodiments described hereinabove in detail except that the lip 24 and the lugs 42 are of a different configuration. The clinch nut 100 of the fifth embodiment further illustrates that the lugs 42 can have a different configuration and illustrates that the lip 24 can have a different configuration.

In the fifth embodiment, the lip 24 has interruptions so that it is formed by a plurality of separate segments each associated with one of the faces 32 of the groove bottom wall 26. The separate segments of the lip 24 include alternating narrow and wide segments 102, 104. The narrow segments 102 generally have a width as described and shown with regard to the first four embodiments. The wide segments 104, however, have an increased width formed by extending the lip 24 further inward toward the inner wall 28 of the groove 22. The interruptions are preferably grooves formed through the lip 24 generally parallel to the length of the narrow segments 102. The bottom surfaces 106 formed by the interruptions are preferably angled or inclined to form extensions of the adjacent bottom wall face associated with the narrow segment 102.

The lugs 42 are formed by protuberances which axially extend above the groove bottom wall 26 adjacent the wide segments 104 of the lip 24. The lugs 42 radially extend across the groove 22 from the groove inner wall 28 to the lip wide segments 104. The upper side of the lugs 42, which is the side opposite the bottom wall 26, is generally parallel with the bottom wall 26 and inclined relative to the lip 24. The outer ends of lug upper sides preferably meet the inner edge of the lip wide segments 104 so that the lugs 42 do not extend above the lip 24. The lugs 42 preferably have a width which extends the full width of the associated face 32 of the bottom wall 26 such that none of the associated face 32 of the bottom wall 26 is exposed.

For example, an acceptable clinch nut 100 having a thread size of M10×1.5 and-for work pieces having a minimum thickness of 0.050 inches (1.27 mm) can have a bottom wall 26 with eight facets 32 inclined at an angle of about 20°. The facets 32 are aligned with the facets 34 of the punch portion inner wall 28 and the faces 38 of the body portion outer periphery. The body portion is about 0.712 to about 0.730 inches across corners, is about 0.666 to about 0.674 inches across flats, and has a height of about 0.314 to about 0.318 inches. The distance between inner edges of the narrow portions 102 of the lip 24 is about 0.600 to about 0.606 inches. The distance between inner edges of the wide portions 104 of the lip 24 is about 0.537 to about 0.543 inches. The punch portion 14 has a height of about 0.043 to about 0.047 inches above the lip 24, a diameter of about 0.514 to about 0.518 inches, and a base diameter at the bottom wall of about 0.484 inches maximum.

Figure 19:
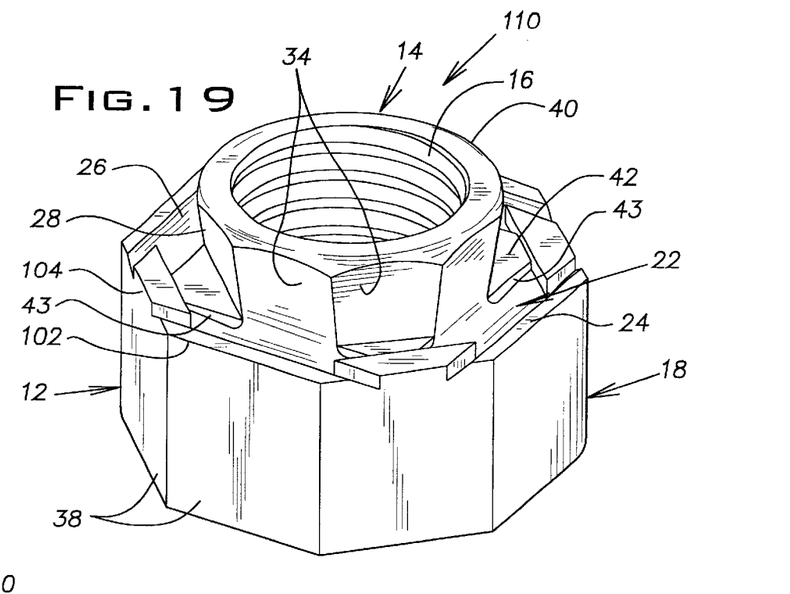
FIG. 19 is a perspective view of a clinch nut according to a sixth embodiment of the present invention.
Figure 20:
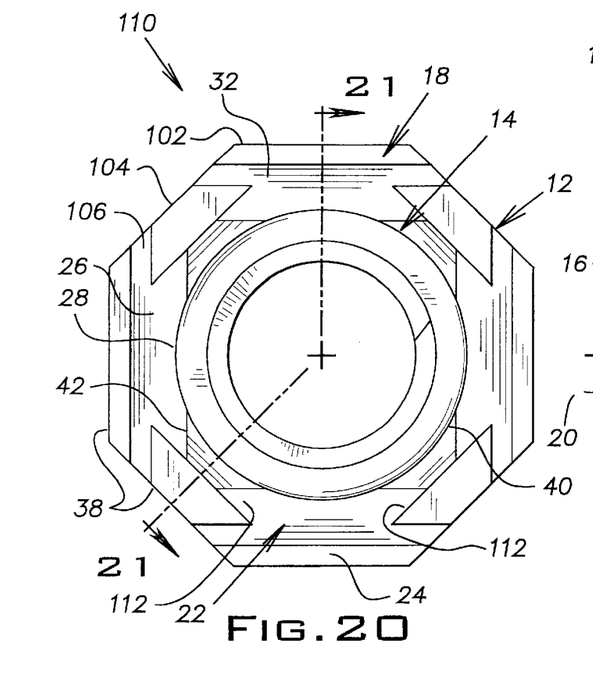
FIG. 20 is a top plan view of the clinch nut of FIG. 19.
Figure 21:
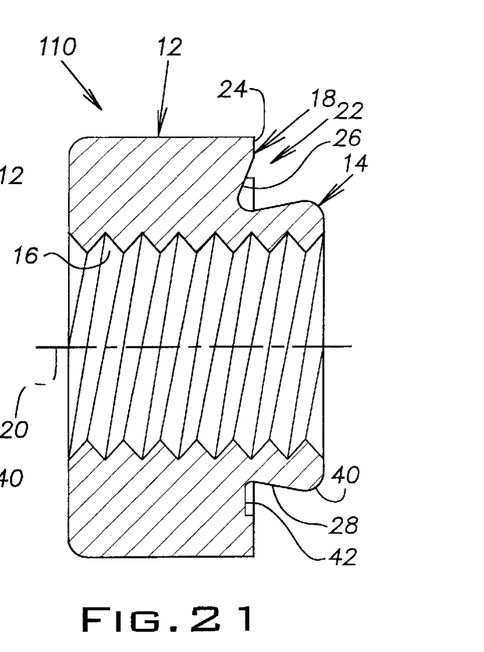
FIG. 21 is a sectional view taken along line 21—21 of FIG. 20.

FIGS. 19–21 illustrate a self-piercing clinch nut 110 according to a sixth embodiment of the present invention wherein like reference numbers are utilized to indicate like structure. The clinch nut 110 of the sixth embodiment is substantially the same as the clinch nut 100 of the fifth embodiment described hereinabove in detail except that the lugs 42 are of a different configuration. The clinch nut 110 of the sixth embodiment further illustrates that the lugs 42 can have different shapes.

The lugs 42 are formed by protuberances which axially extend above the groove bottom wall 26 adjacent the wide segments 104 of the lip 24. The lugs 42 radially extend across the groove 22 from the groove inner wall 28 to the wide segments 104 of the lip 24. The upper side of the lugs 42, which is the side opposite the bottom wall 26, is generally parallel with the upper side of the lip 24 but is recessed below the lip 24. The outer ends of the lugs 42 preferably extend less than the full width of the lip wide segments 104 and have an increasing width in an inward direction toward the inner wall 28. The bottom surfaces 112 formed by the reduced size of the lugs 42 are preferably angled or inclined to form extensions of the adjacent bottom wall face associated with the narrow segment 102.

For example, an acceptable clinch nut 110 having a thread size of M10×1.5 and for work pieces having a minimum thickness of 0.050 inches (1.27 mm) can have a bottom wall 26 with eight facets 32 inclined at an angle of about 20°. The facets 32 are aligned with the facets 34 of the punch portion inner wall 28 and the faces 38 of the body portion outer periphery. The body portion is about 0.712 to about 0.730 inches across corners, is about 0.666 to about 0.674 inches across flats, and has a height of about 0.314 to about 0.318 inches. The distance between inner edges of the narrow portions 102 of the lip 24 is about 0.600 to about 0.606 inches. The distance between inner edges of the wide portions 104 of the lip 24 is about 0.537 to about 0.543 inches. The punch portion 14 has a height of about 0.043 to about 0.047 inches above the lip 24, a diameter of about 0.514 to about 0.518 inches, and a base diameter at the bottom wall of about 0.484 inches maximum.

Figure 22:
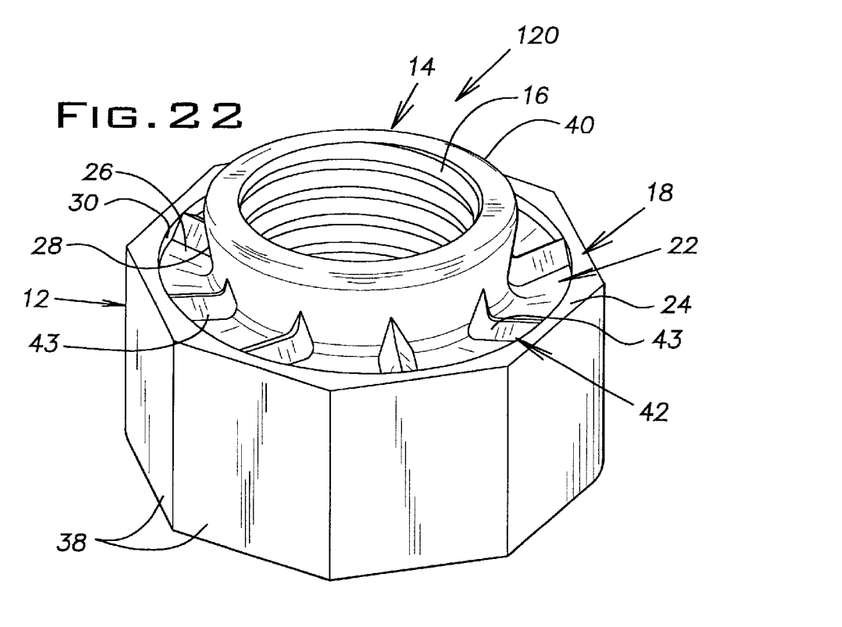
FIG. 22 is a perspective view of a clinch nut according to a seventh embodiment of the present invention.
Figures 23, 24:
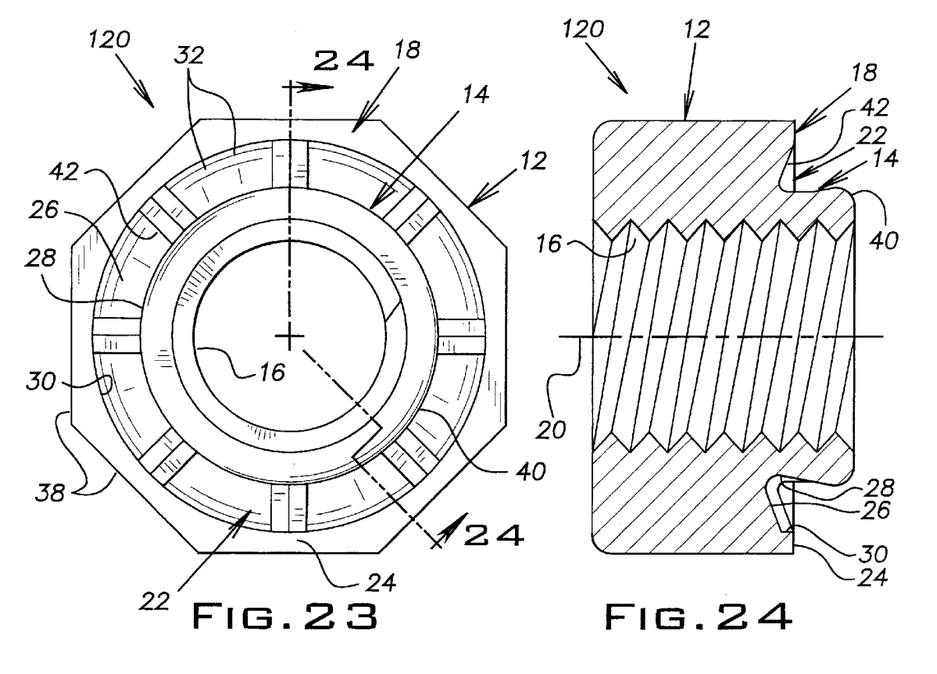
FIG. 23 is a top plan view of the clinch nut of FIG. 22.
FIG. 24 is a sectional view taken along the line 24—24 of FIG. 23.

FIGS. 22–24 illustrate a self-piercing clinch nut 120 according to a seventh embodiment of the present invention wherein like reference numbers are utilized to indicate like structure. The clinch nut 120 of the seventh embodiment is substantially the same as the clinch nut 10 of the first embodiment described hereinabove in detail except that the walls 26, 28, 30 of the groove 22 are generally circular rather than faceted and the lugs 42 are of a different configuration. The clinch nut 120 of the seventh embodiment further illustrates that the groove walls 26, 28, 30 can have other shapes and further that the lugs 42 can have different shapes.

The groove bottom wall 26 is inclined as described in detail hereinabove, but is now circular without the above described facets. The bottom wall 26 of the seventh embodiment is generally frusto-conically shaped. The inner wall 28 is also inclined as described in detail hereinabove, but is also now circular without the above described facets. The inner wall 28 of the seventh embodiment is generally frusto-conically shaped. The groove outer wall 30 is circular or cylindrically-shaped. It is noted that this circular shape of the groove 22 can be utilized in each of the other embodiments.

The lugs 42 are formed by protuberances which axially extend above the groove bottom wall 26 and radially extend across the groove 22 from the groove inner wall 28 to the inner wall. The inner ends of the lugs also extend upward along the inner wall 26 or punch portion 14. The lugs 42 are generally triangular in cross-section forming a central top edge and have decreasing widths in the inward direction to form points or tips at the inner ends of the lugs 42.

Figure 1A:
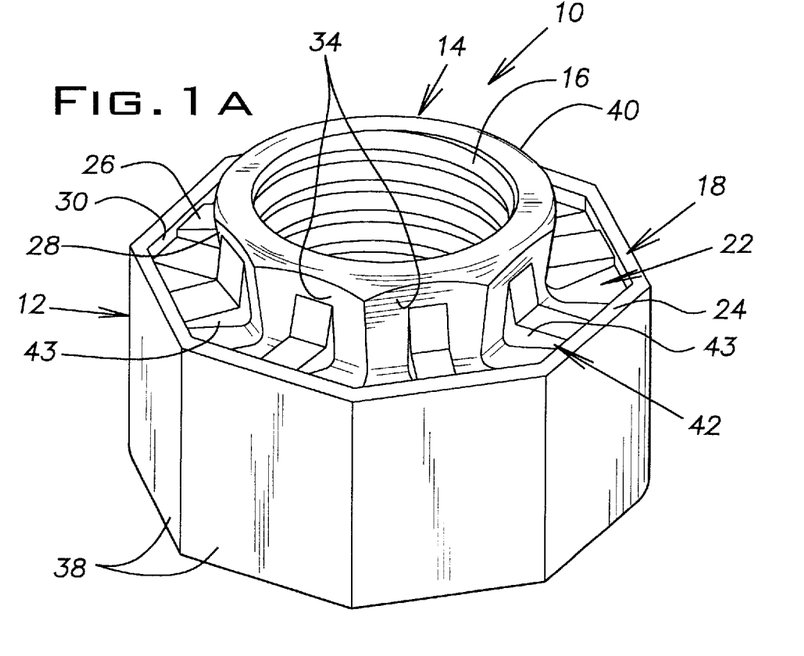
FIG. 1A is a perspective view of a clinch nut according to a variation of the clinch nut of FIG. 1.
Figure 3A:
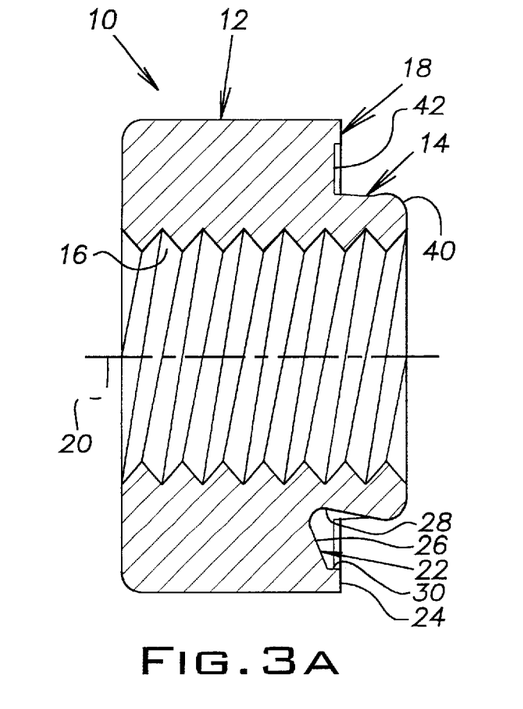
FIG. 3A is a sectional view similar to FIG. 3 but of the clinch nut of FIG. 1A.
Figure 25:
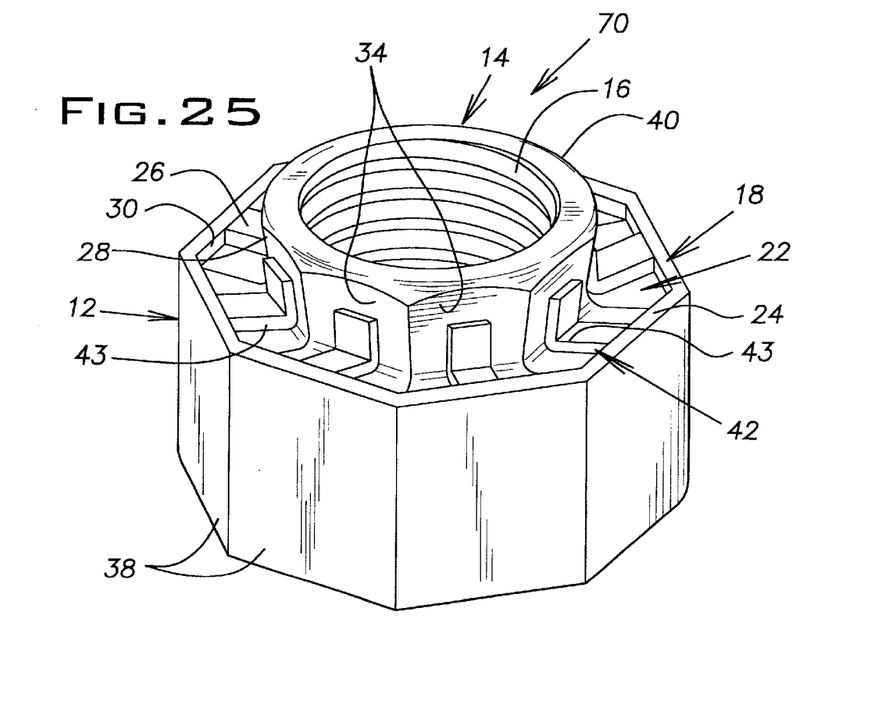
FIG. 25 is a perspective view according to a variation of the clinch nut of FIG. 7.
Figure 26:
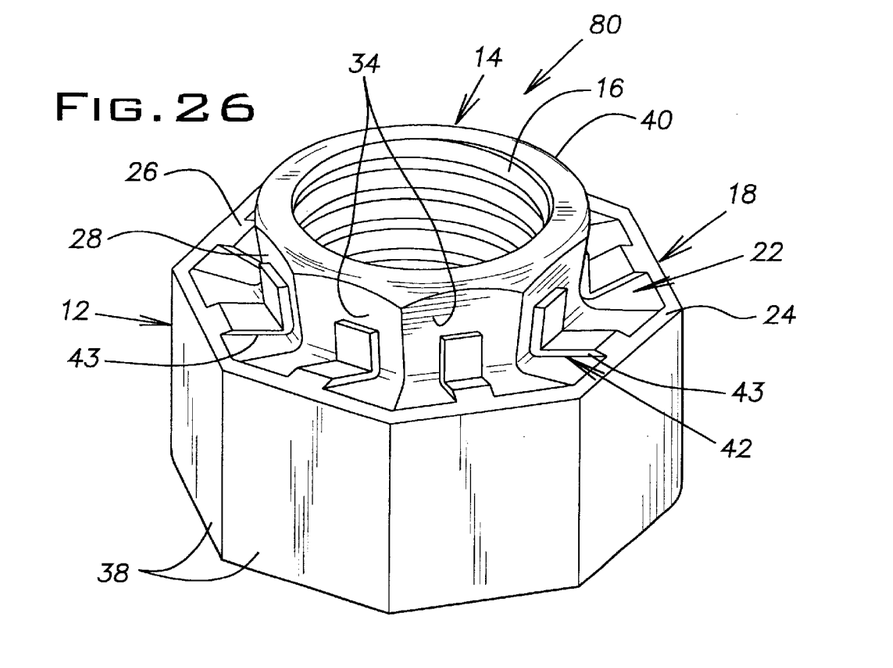
FIG. 26 is a perspective view according to a variation of the clinch nut of FIG. 10.

FIGS. 1A, 2 and 3A, illustrate a variation of the clinch nut 10 of the first embodiment shown in FIGS. 1–3, wherein like reference numbers are utilized to indicate like structure. The clinch nut is substantially the same as the clinch nut 10 of the first embodiment described hereinabove in detail except that the lugs 42 extend upward along the facets 34 of the punch portion 14 above the lip 24. This variation of the clinch nut 10 further illustrates that the lugs 42 can upwardly extend along the inner wall 28. FIGS. 25 and 26 respectively illustrate the foregoing with respect to the clinch nut 70 of the second embodiment shown in FIGS. 7–9 and the clinch nut 80 of the third embodiment shown in FIGS. 10–12.

Although particular embodiments of the invention have been described in detail, it will be understood that the invention is not limited correspondingly in scope, but includes all changes and modifications coming within the spirit and terms of the claims appended hereto.

What is claimed is:

1. A self-clinching fastener for attachment to a plastically deformable metal panel, said self-clinching fastener comprising a body portion with a central axis and a central punch portion extending from said body portion and coaxial with said central axis, said body portion forming a generally annular-shaped end face adjacent said central punch portion and a groove defined in said end face encircling said central punch portion, said groove having an inclined inner wall forming an undercut and an inwardly extending bottom wall, and a plurality of spaced apart lugs encircling said central punch portion and axially extending from said bottom wall of said groove along substantially the full radial extent thereof, said end face having a lip adjacent an outer periphery of said groove and said lip extending above said lugs, said lugs forming abutments to improve torsional resistance of said fastener.

2. The self-piercing fastener according to claim 1, wherein said bottom wall is inclined at an angle greater than about 2° and less than about 50° relative to a plane perpendicular to the central axis.

3. The self-clinching fastener according to claim 1, wherein said lugs have a generally rectangular cross-section, said lugs having a generally rectangular cross-section formed by generally flat upper sides axially spaced from said bottom wall, said abutments extending from said bottom wall to said upper sides, said upper sides being of greater dimension than said abutments.

4. The self-clinching fastener according to claim 1, wherein said lugs include an axial portion that extends along at least a part of said central punch portion with said flat upper sides radially spaced from said inclined inner wall and said abutments extend from said inclined inner wall to said flat upper sides.

5. The self-clinching fastener according to claim 1, wherein said lugs-have a generally rectangular cross-section formed by generally flat upper sides axially spaced from said bottom wall and having a width dimension extending in the direction of fastener rotation, said abutments having an axial dimension extending from said bottom wall to said upper side, said width dimension of said upper side being greater than said axial dimension of said abutment.

6. The self-clinching fastener according to claim 5, wherein said lugs include an axial portion that extends along at least a part of said central punch portion with said flat upper sides radially spaced from said inclined inner wall and said abutments extend from said inclined inner wall to said flat upper sides.

7. The self-clinching fastener according to claim 6, wherein said upper sides are generally parallel with said bottom wall.

8. The self-clinching fastener according to claim 6, wherein a total of eight lugs are provided.

9. The self-piercing fastener according to claim 6, wherein said bottom wall is inclined at an angle greater than about 2° and less than about 50° relative to a plane perpendicular to the central axis.

10. The self-clinching fastener according to claim 1, wherein said lip is generally perpendicular to said central axis.

11. A self-clinching fastener for attachment to a plastically deformable metal panel, said self-clinching fastener comprising a body portion with a central axis and a central punch portion extending from said body portion and coaxial with said central axis, said body portion forming a generally annular-shaped end face adjacent said central punch portion and a groove defined in said end face encircling said central punch portion, said groove having an inclined inner wall forming an undercut and an inwardly extending bottom wall, and a plurality of spaced apart lugs encircling said central punch portion and axially extending from said bottom wall of said groove along substantially the full radial extent thereof, said lugs forming abutments to improve torsional resistance of said fastener, said lugs having a generally rectangular cross-section formed by generally flat upper sides axially spaced from and parallel with said bottom wall, said lugs also having a width dimension extending in the direction of fastener rotation, said abutments having an axial dimension extending from said bottom wall to said upper side, said width dimension of said upper side being greater than said axial dimension of said abutment, said lugs including an axial portion that extends along at least a part of said central punch portion with said flat upper sides radially spaced from said inclined inner wall and said abutments extending from said inclined inner wall to said flat upper sides, said upper sides.

12. The self-piercing fastener according to claim 11, wherein said bottom wall is inclined at an angle greater than about 2° and less than about 50° relative to a plane perpendicular to the central axis.

13. The self-clinching fastener according to claim 11, wherein a total of eight lugs are provided.

14. The self-piercing fastener according to claim 11, wherein said bottom wall is inclined at an angle greater than about 2° and less than about 50° relative to a plane perpendicular to the central axis.

15. The self-clinching fastener according to claim 11, wherein said end face has a lip adjacent an outer periphery of said groove and said lip extends above said lugs.

16. The self-clinching fastener according to claim 11, wherein said lip is generally perpendicular to said central axis.

* * * * *